United States Patent [19]
Caras

[11] Patent Number: 6,056,447
[45] Date of Patent: May 2, 2000

[54] COVARIANT OPTICAL MODULE

[75] Inventor: Bernard Caras, Princeton, N.J.

[73] Assignee: Lucent Technologies, Inc., Murray Hill, N.J.

[21] Appl. No.: 09/055,627

[22] Filed: Apr. 6, 1998

[51] Int. Cl.$^7$ ..................................................... G02B 6/42
[52] U.S. Cl. ............................................. 385/92; 385/94
[58] Field of Search .................................. 385/88, 92, 94

[56] References Cited

U.S. PATENT DOCUMENTS

| | | | |
|---|---|---|---|
| 4,752,109 | 6/1988 | Gordon et al. | 385/14 |
| 5,111,522 | 5/1992 | Chaoui et al. | 385/92 |
| 5,333,225 | 7/1994 | Jacobowitz et al. | 385/93 |
| 5,793,915 | 8/1998 | Joyce | 385/91 |
| 5,854,869 | 12/1998 | Joyce | 385/92 |
| 5,963,695 | 10/1999 | Joyce | 385/88 |

*Primary Examiner*—John D. Lee
*Assistant Examiner*—Michelle R. Connelly-Cushwa

[57] ABSTRACT

An optical module is disclosed wherein the thermal stress induced therein is substantially minimized so as to reduce the interference with the alignment of the optical component (s) enclosed therein. The optical module includes a housing having an assembly platform and sidewalls joined by brazing or soldering. However, because of mechanical, electrical and thermal considerations, the sidewalls and assembly platform are usually made of dissimilar materials. In one embodiment, the optical module includes an assembly platform made of a Cu—W composite, and sidewalls made of Kovar®. Although nonlinear, the thermal expansion of Kovar® is substantially linear away from its Curie temperature, with the slope proportional to the thermal expansion coefficient. On the other hand, the thermal expansion profile of Cu—W is substantially linear, with the thermal expansion coefficient determined by the ratio of Cu to W. Thermal stress is substantially reduced by setting the ratio of Cu to W so as to match the thermal expansion of Kovar® along the region below the Curie temperature of Kovar®. That is, the thermal expansion coefficient for each material is made substantially the same below the Curie temperature so as to maintain the Cu—W's covariance with Kovar®. A suitable, rigid braze material, such as Au—Sn, having a melting temperature below Kovaro®'s Curie temperature, is used to join the assembly platform to the sidewalls of the housing.

42 Claims, 6 Drawing Sheets

COVARIANT OPTICAL MODULE

TECHNICAL FIELD

The present invention relates to electro-optical and optical modules and, more particularly, to an optical module wherein thermal stress induced therein is substantially minimized so as to reduce the interference with the alignment of the optical component(s) enclosed therein.

BACKGROUND OF THE INVENTION

Optical as well as electro-optical modules, such as optical pumps, electro-optical modulators, optical amplifiers, transmitters, receivers, transceivers and the like, typically use a modified standard electronic housing to hermetically house optical and/or electro-optical components. Such a modified housing differs from the standard electronic package or housing in that an optical path(s) must pass through the wall of the housing, either thru a lens or an optical fiber.

In the prior art, optical modules typically use a so-called "14-pin butterfly" housing or package. Such an optical package includes an assembly platform, typically holding an optical fiber in alignment with an optical component, such as a laser or detector. More specifically, the optical component(s) is soldered to a carrier, and in turn, the carrier to the platform. Moreover, the optical fiber is encased within, for example, a ferrule soldered to an U-shaped clip, the clip soldered to another carrier, and in turn, that carrier soldered to the assembly platform so as to maintain the alignment between the optical fiber and the optical component(s).

During assembly, wherein the optical module is repeatedly subjected to elevated temperatures, such as during testing, soldering or when the module is hermetically sealed, undesired thermal stress in the module causes the fiber to move relative to the optical component(s), thereby drastically lowering the coupling efficiency. Reworking the optical module, such as through mechanical or thermal means, restores the coupling efficiency, but only by a limited amount. To reduce thermal stress, attempts have been made to match the thermal expansions of the carrier, sidewalls and platform of the housing, but have proven to be only partially successful.

Today, "14-pin butterfly" packages have an assembly platform made of a Cu—W composite, and carriers and sidewalls made of Kovar®. Although these materials have a similar thermal expansion, subjecting the optical module to elevated temperatures still dramatically lowers the coupling efficiency.

Accordingly, a need therefore still exits for the reduction of thermally induced stress in optical modules as well as electronic modules.

SUMMARY OF THE INVENTION

It has been discovered that although the housing of an electro-optical or optical module may be manufactured to be free of thermal stress at room temperature, a certain amount of thermal stress may still be induced when the optical and/or electro-optical components are later assembled in the module at an elevated temperature, causing the components to move relative to each other.

Typically, an optical module includes a housing having an assembly platform and sidewalls joined by brazing or soldering. Because of mechanical, electrical and thermal considerations, the sidewalls and assembly platform are usually made of dissimilar materials, such as Kovar® and Cu—W, respectively.

In accordance with the teachings of the present invention, it has been found that the thermal stress can be substantially reduced by reformulating the material composition of the assembly platform. More specifically, the composition is reformulated so as to match the thermal expansion profile of the sidewalls along a portion below an inflection temperature of the latter's thermal expansion profile, and then using a braze or solder material that melts below the inflection temperature for joining the assembly platform to the sidewalls of the housing.

In one embodiment, the optical module includes an assembly platform made of a Cu—W composite, and sidewalls made of Kovar®. Although nonlinear, the thermal expansion profile of Kovar® is substantially linear along either side of its Curie temperature, with the slope proportional to the thermal expansion coefficient. On the other hand, the thermal expansion profile of the Cu—W composite is substantially linear, with the thermal expansion coefficient determined by the ratio of Cu to W.

In accordance with the principles of the invention, the thermal stress can be substantially reduced by setting the ratio of Cu to W in the Cu—W composite so as to match the thermal expansion profile of the Kovar® along the region below the Curie temperature. That is, the thermal expansion coefficient for each material is made substantially the same below the Curie temperature so as to maintain the Cu—W's covariance with Kovar®. A suitable, rigid braze material, such as Au-Sn, having a melting temperature below the Kovar®'s Curie temperature is used to join the assembly platform to the sidewalls of the housing.

Reformulating the Cu—W ratio such that the thermal expansion profile only matches that of Kovar® for temperatures below the Curie temperature, and then selecting a suitable braze or solder material that melts below that latter temperature has been discovered to substantially minimize the thermal stress so as to not interfere with the alignment of optical components enclosed within the module.

Thus, optical modules assembled in accordance with the present invention address the problems associated with prior art optical modules, particularly, undesired thermal stress in the module causing, for example, an optical fiber to move relative to the optical components.

BRIEF DESCRIPTION OF THE DRAWINGS

The features and advantages of the present invention will become more readily apparent from the following detailed description of the invention in which like elements are labeled similarly and in which.

DETAILED DESCRIPTION

Without any loss of generality or applicability for the principles of the invention, the embodiment below is directed to a laser module employing a "14-pin butterfly" housing or package. It should, however, be clearly understood that the present invention is equally applicable to other optical modules, such as receivers and transceivers. Also, the present invention is equally applicable to electro-optical or electronic housings wherein thermal stress can cause unwanted effects in the performance of the module.

Figure 1:
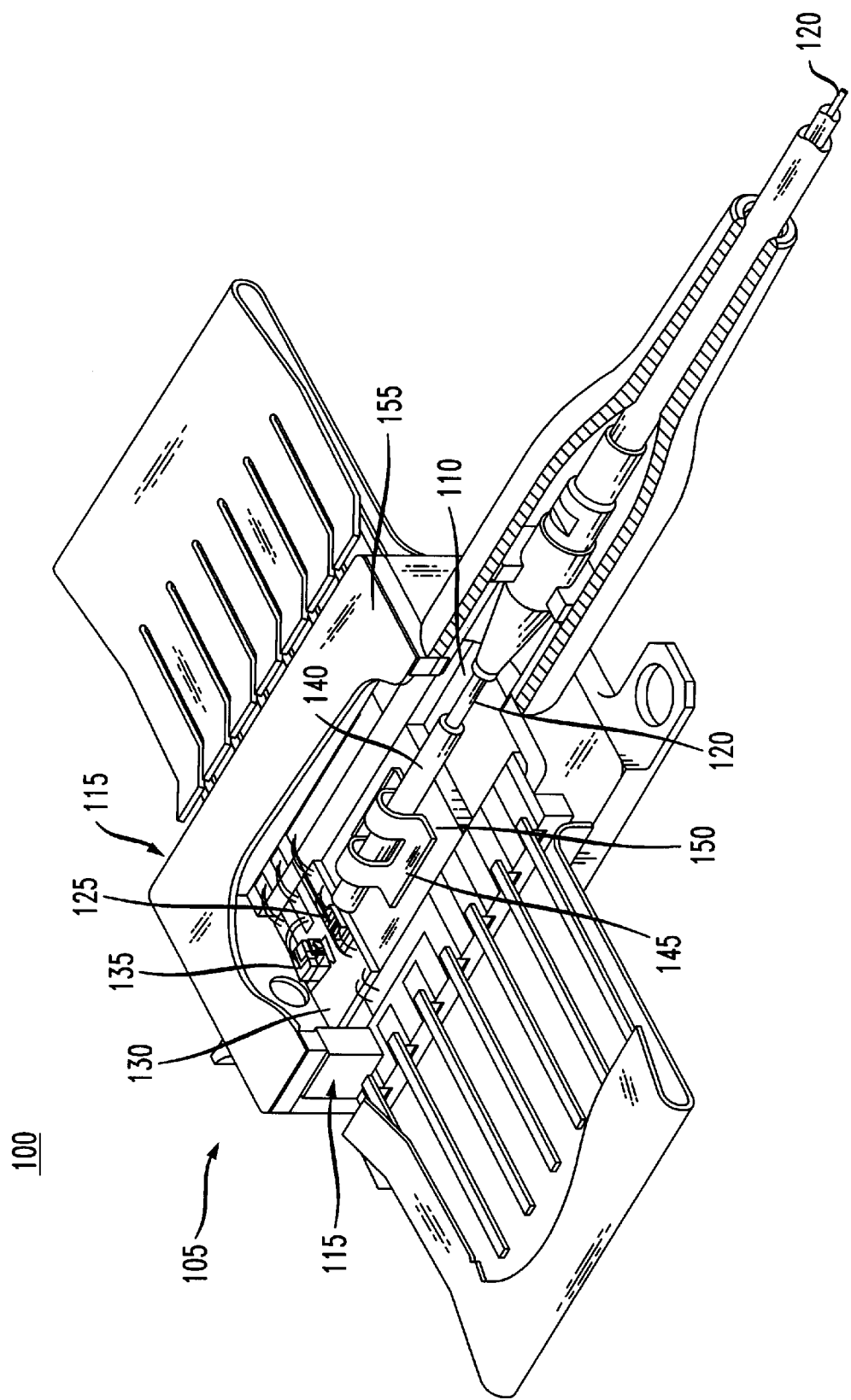
FIG. 1 depicts a perspective cut-away view of a "14-pin butterfly" package laser module constructed in accordance with the principles of the present invention.
Figure 2:
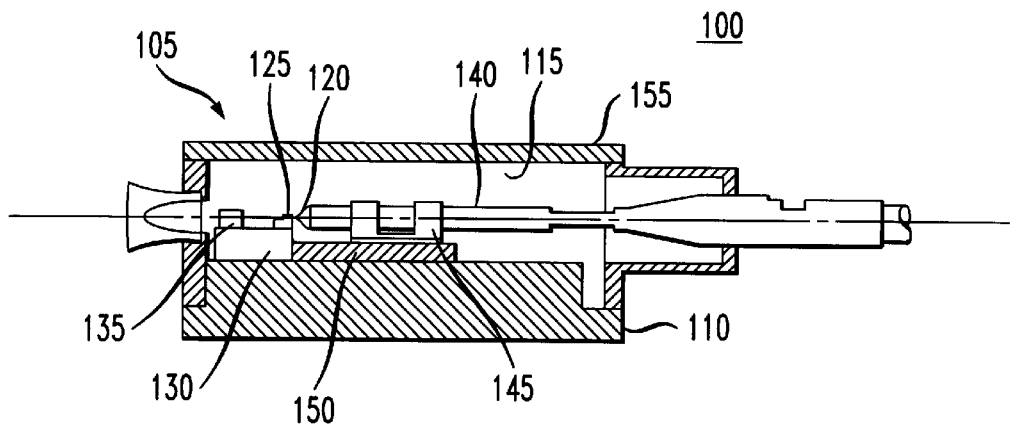
FIG. 2 depicts a cross section view of the laser module of FIG. 1.

Referring to FIGS. 1 and 2, there is shown an exemplary embodiment of a "14-pin butterfly" package laser module 100 comprising: a housing 105 having an opening along its top side for providing access to the interior thereof; an assembly platform 110; and sidewalls 115. There is an opening at an end sidewall of the housing for allowing the passage of an optical fiber 120 into the interior of the housing. Alternatively, a lens may be disposed in the sidewall of housing. In this latter instance, the optical axes of the lens and laser are in alignment so as to couple the light emitted from the laser to the exterior of the housing.

A laser 125, typically operating at 1.48 μm, is supported on a carrier 130, and in turn, the carrier attached to assembly platform 110. A photodetector 135 may be also disposed on carrier 130 to monitor the optical power from the laser. Because of mechanical, electrical and thermal considerations, the carrier, sidewalls and assembly platform are usually made of dissimilar materials. For example, carrier 130 may be made of BeO, which is not only a good electrical insulator, but also a good thermal conductor. In this manner, electrical isolation and thermal conductivity can be readily provided for the laser.

Also, it is customary for the assembly platform to be made of a Cu—W composite, and the sidewalls to be made of Kovar®, which is a trade name of a material comprising a combination of iron, nickel and cobalt, (ASTM F-15). Those skilled in the art will readily note that Kovar® is a good thermal insulator having a low thermal expansion coefficient, and has long been widely used in power tubes, microwave tubes, transistors, and diodes, as well as integrated circuits.

Optical fiber 120 is held within a metal ferrule 140 which extends through the opening to the exterior of the housing. Alignment between fiber 120 and laser 125 is maintained by, for example, an U-shaped clip 145 which is welded both to ferule 140 and a carrier 150, which is in turn, soldered to assembly platform 110. Typically, ferrule 140 as well as carrier 150 is likewise made of Kovar®. After assembly, a cover 155 is welded to the top opening of housing 105 so as to seal the optical components in the housing and, thereby protects the optical fiber and laser from the environment.

Any displacement of the optical components within the housing relative to the fiber can cause substantial coupling loss. In the prior art, to ensure mechanical stability, a hard, rigid braze or solder material is used to solder or braze Kovar® sidewalls 115 to the Cu—W assembly platform. The prevailing wisdom is to use a Cu—Ag braze, which melts at about 780° C. Of course, other high melting point, low creep solders have been used.

Figure 3:
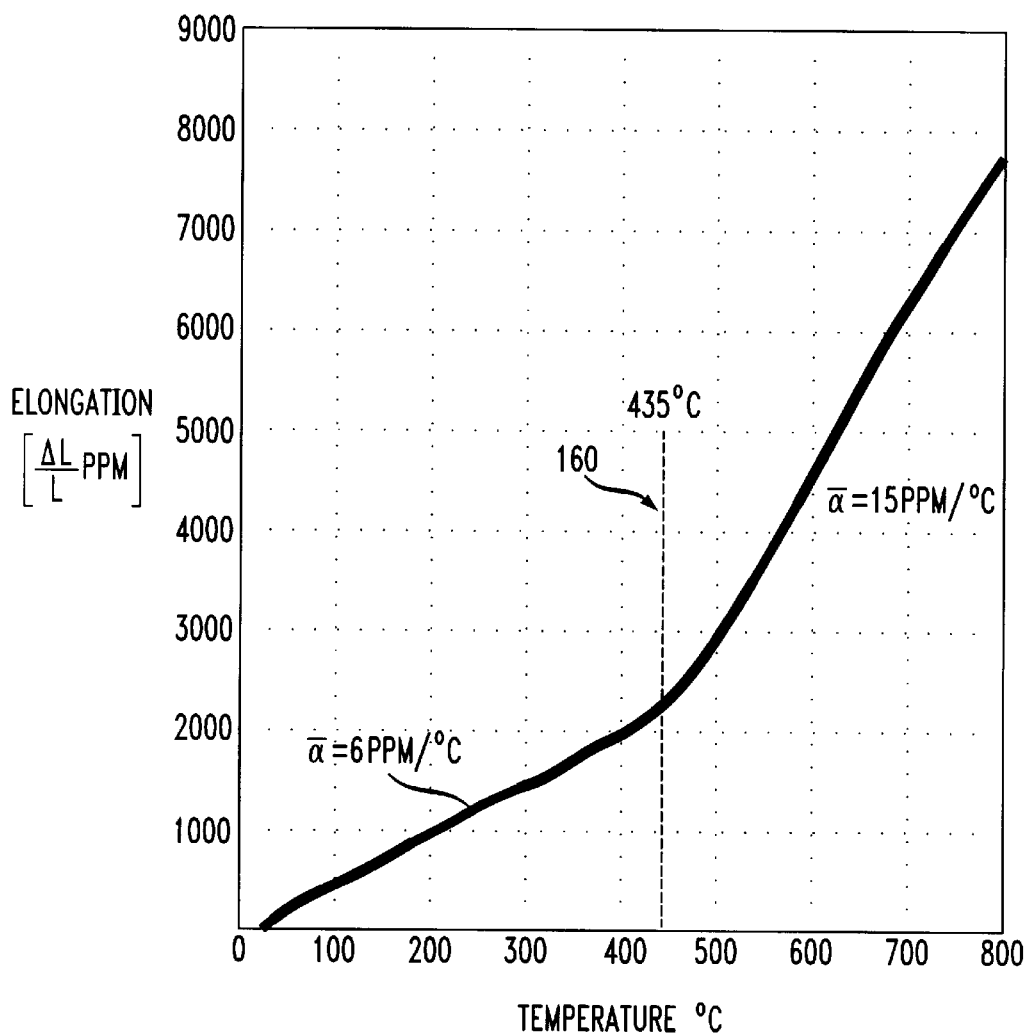
FIG. 3 depicts an illustrative plot of the thermal expansion or elongation versus temperature for Kovar®.

Furthermore, understanding this need for mechanical stability, the housing is typically manufactured to be free of stress at room temperature. To do so, an attempt is made in the prior art to match the thermal expansion or elongation (ΔL/L ppm) for the dissimilar materials, specifically the Cu—W composite and the Kovar®. Shown in FIG. 3 is the thermal expansion or elongation of the Kovar® for temperatures from 25° C. to about 780° C., the brazing temperature of the Cu—Ag braze typically used in joining the seams of the housing. Although nonlinear, the thermal expansion profile is, however, somewhat linear along either side of an inflection temperature 160 located at about the Curie temperature (435° C.). It should be clearly understood that the slope of the curve is proportional to the thermal expansion coefficient (ppm/° C.), α. From about 25° C. to 435° C., the average thermal expansion coefficient, $\bar{\alpha}$ is about 6 ppm/° C., whereas from 435° C. to 735° C. it is about 15 ppm/° C.

Figure 4:
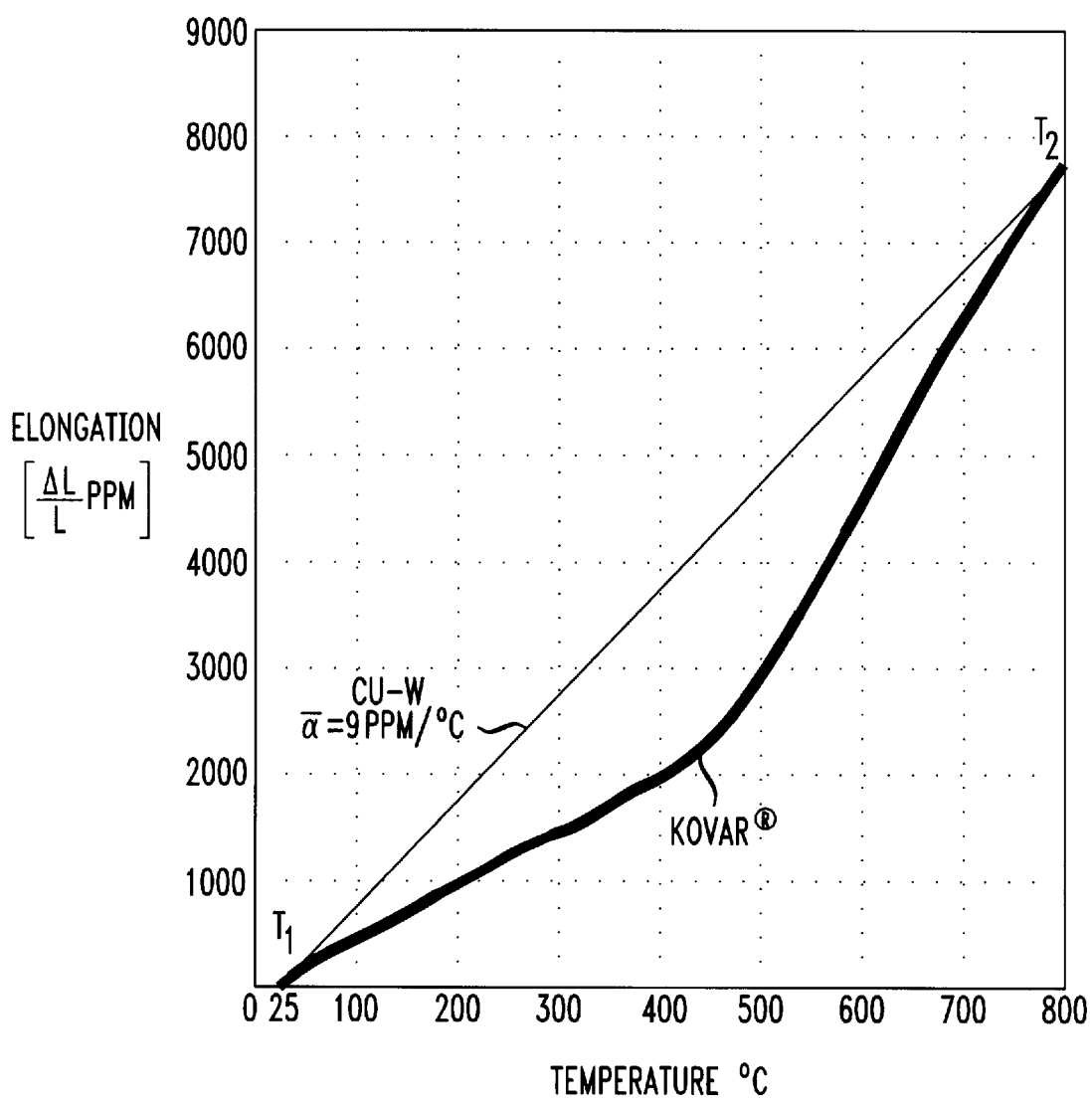
FIG. 4 depicts illustrative plots of the thermal expansion versus temperature for Kovar®, and a Cu—W composition matched to have the same overall thermal expansion as Kovar® between temperatures $T_1$ (25° C.) and $T_2$ (780° C.)

The thermal expansion profile of Cu—W, however, is substantially linear, with its slope or thermal expansion coefficient determined by the ratio of Cu to W. So as to provide the housing substantially free of thermal stress, the Cu to W ratio in the prior art is adjusted such that the thermal expansions of the dissimilar materials are matched at end points $T_1$ and $T_2$ of the brazing or working temperature range, as shown in FIG. 4. That is, the thermal expansion coefficient of the Cu—W is adjusted to match the average thermal expansion coefficient of the Kovar® from room temperature to the brazing temperature, which is about 9 ppm/° C. In this manner, after the dissimilar materials have cooled from the brazing or soldering temperature ($T_2$) to room temperature ($T_1$), each material (Cu—W shown in dashed and Kovar® in solid), now jointed together, have contracted the same amount, thereby yielding a stress free housing.

Figure 5:
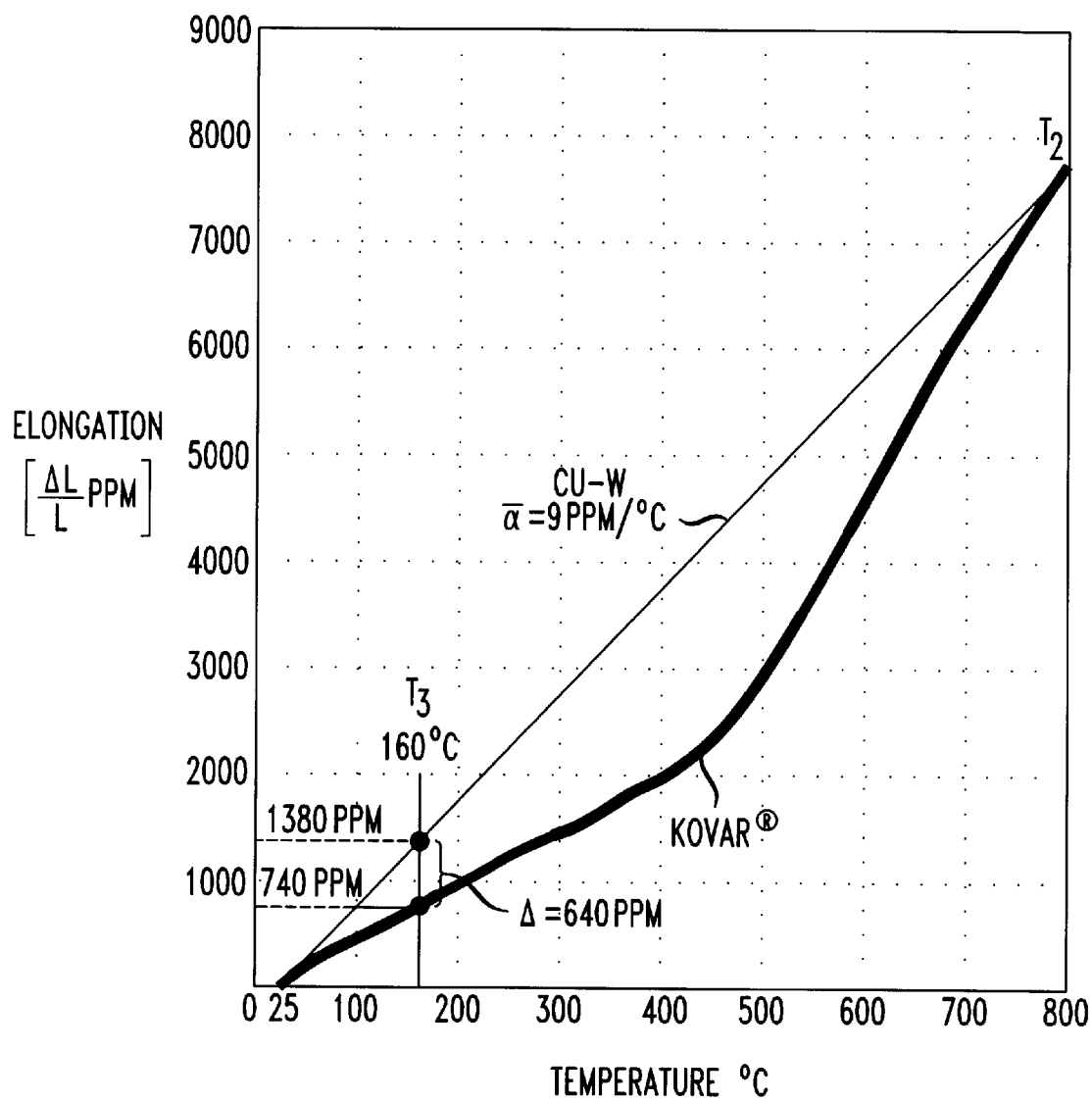
FIG. 5 depicts illustrative plots of the thermal expansion versus temperature for Kovar®, and a Cu—W composition matched to have the same overall thermal expansion as Kovar® between temperatures $T_1$ (25° C.) and $T_2$ (780° C.) for illustrating the difference in the elongation between the dissimilar materials at a temperature $T_3$ (160° C.)
Figure 6:
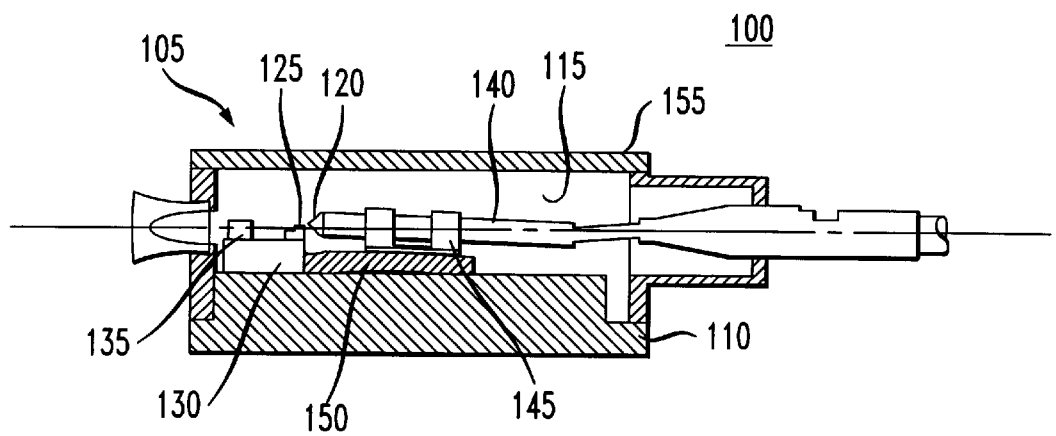
FIG. 6 depicts a cross section view of the laser module of FIG. 1 exhibiting warping near the seam or joint of the Kovar® carrier and Cu—W assembly platform.

When assembling the laser module, the housing is repeatedly subjected to elevated temperatures, such as when the Kovar® carrier(s) is soldered to the Cu—W assembly platform at a temperature of about 160° C. ( $T_3$). Unfortunately, using the methodology of the prior art, each dissimilar material when later joined and then cooled to room temperature ($T_1$) contracts a different amount. For example, referring to FIG. 5, the Kovar® contracts about 740 ppm when cooled from 160° C. ($T_3$) to room temperature ($T_1$), while the Cu—W contracts substantially more, about 1380 ppm. Because the materials are joined together and not free to move independently, this difference (Δ=640 ppm) induces thermal stress in the module, which can result in a bending or warping of, for example, carrier 150, as illustrated in FIG. 6. This, in turn, can cause the fiber to move relative to the laser, thereby lowering the optical coupling. Further subjecting the laser module to elevated temperatures only worsen the situation, such as when age testing the module.

Figure 7:
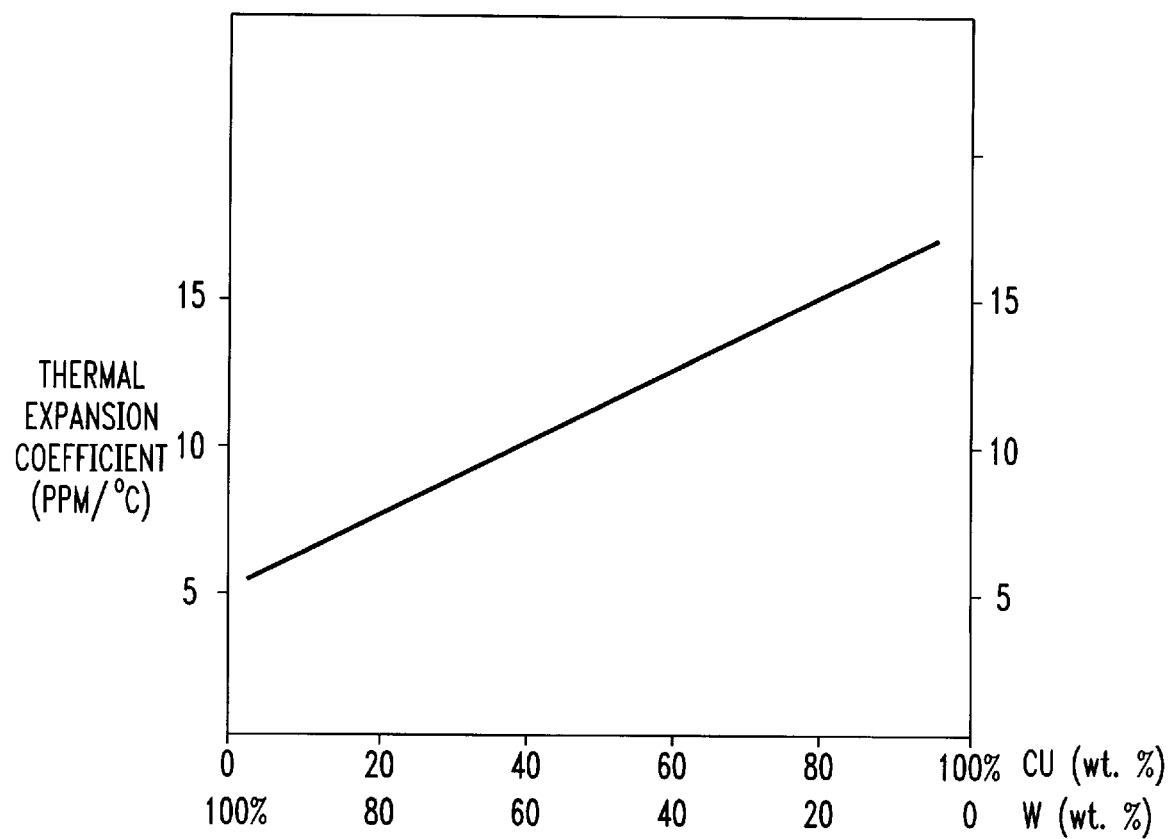
FIG. 7 depicts an illustrative plot of the thermal expansion coefficient of Cu—W as a function of the weight percent (wt. %) of Cu and W.

In accordance with the principles of the invention, it has been discovered that the above described thermal stress can be substantially reduced by setting the ratio of Cu to W to match the thermal expansion profile of the Kovar® only along the region that lies below the Curie temperature of the Kovar®. That is, the thermal expansion coefficient for each material up until the Curie temperature is made substantially the same, or about 6 ppm/° C. Shown in FIG. 7 is an illustrative plot of the thermal expansion coefficient versus the weight percent of Cu or W. Those skilled in the art, however, will readily understand that since the thermal expansion coefficient may be dependent on the particular type of alloy, heat treatment, and other factors, values for individual specimens can vary.

Also, listed below are the thermal expansion coefficients for some Cu—W composites listed under their specific trade names, which have varying amounts of Cu and W. Cu—W composites with any desired thermal expansion coefficient value are readily purchased from numerous vendors, such as Spectracomposite, Inc.

| Material<br>Trade Name | Thermal Expansion<br>Coefficient ($10^{-6}$ m/m/° C.) |
|---|---|
| SC 6.1 | 5.7 |
| T68 | 6.5 |
| W10 (89W-11Cu) | 6.5 |
| W15 (85W-15Cu) | 7.2 |
| W20 (80W-20Cu) | 8.3 |
| P90/10 | 6.5 |

Figure 8:
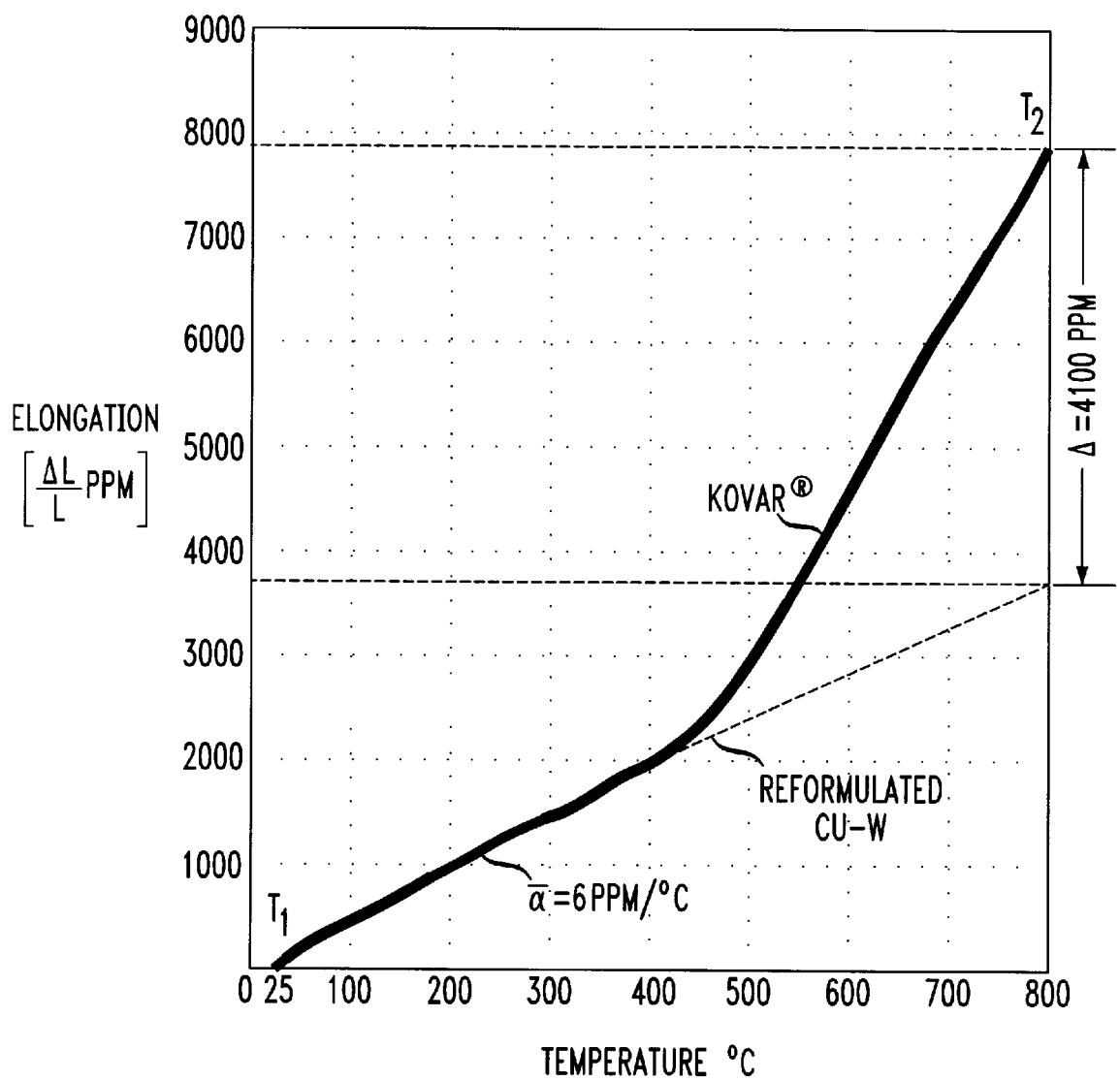
FIG. 8 depicts illustrative plots of the thermal expansion versus temperature for Kovar®, and a Cu—W composition matched to have the same thermal expansion profile as Kovar® at temperatures below the Curie temperature (435° C.) of Kovar®.

It should be understood that simply modifying the Cu—W ratio does not solve the thermal stress problem completely. Following the conventional wisdom of using a Cu—Ag braze or other high temperature braze or solder would still yield a housing with thermal stress. This is so because of the thermal expansion mismatch of the dissimilar materials now for temperatures above the Curie temperature of the Kovar®, which temperatures are required to join the sidewalls and housing together using the Cu—Ag braze. In brazing the Kovar® sidewalls to the Cu—W assembly platform with Cu—Ag, each material contracts a different amount, $\Delta=4100$ ppm, when cooled to room temperature, as illustrated in FIG. 8.

Accordingly, it has been further discovered that the Cu—Ag braze, used in the prior art, must be replaced with a more suitable, rigid braze material having a melting temperature below the Curie temperature of Kovar®. In this latter manner, assembling the housing by joining the sidewalls and assembly platform no longer induces thermal stress since the Cu—W maintains its covariance with Kovar®. And, later, when the optical components are assembled within the housing, a thermal stress free state still exists, inasmuch as the Cu—W and Kovar® each contracts and expands the same amount.

A suitable replacement braze material is an eutectic composition of Au—Sn, which melts at about 280° C. Other suitable braze materials are eutectic compositions of Au—Ge, melting at a slightly higher temperature of about 361° C. Also, eutectic compositions of Au—Si may be used. The particular material chosen, however, is dependent on various design considerations, such as the type and desired properties of the joint between the materials. For a general discussion of solders and brazes, see generally, the book entitled *"Principles of Soldering and Brazing,"* Humpston et al., ASM International: The Materials Information Society, 1996. Preferably, the braze or solder material, however, is of an eutectic composition so to maintain a reasonable fluidity.

Reformulating the Cu—W ratio such that its thermal expansion profile or coefficient matches that of the Kovar® for temperatures below the Curie temperature, and then selecting a suitable braze or solder material that melts below that latter temperature results in substantially minimizing the thermal stress. As such, later assembling procedures do not interfere with the alignment of optical components enclosed within the module. Fortuitously, the thermal expansion coefficient of BeO carrier 130 is substantially the same as the Kovar® and the reformulated Cu—W composition. Otherwise, a different material can be chosen for carrier 130 to likewise match the thermal expansion profile of the Kovar®, at least for temperatures below its Curie temperature.

It should be clearly understood that the soldering, brazing or working temperature used to solder the carrier to the assembly platform should be less than the melting temperature of the braze or solder material used in joining the assembly platform to the sidewalls of the housing. Of course, alternative means, such as epoxies, laser welding, or any other suitable means known in the art may be used so long as the working temperature is below the melting temperature of the solder used to join the assembly platform to the sidewalls.

Thus, the optical modules assembled in accordance with the present invention address the problems associated with the prior art optical modules, particularly, undesired thermal stress in the module, causing the fiber to move relative to the optical component(s). Accordingly, the present invention reduces the need for reworking the optical module, such as through mechanical or thermal means, to improve the coupling efficiency, thereby decreasing product cost and increasing manufacturing efficiency.

It should be understood that the embodiments herein are merely illustrative of the principles of the invention. Various modifications may be made by those skilled in the art which will embody the principles of the invention and fall within the spirit and the scope thereof. For example, electronic housing modules typically use Ni—Fe alloy walls along with Cu—W heat sinks. Such Ni—Fe alloys, such as a so-called # 42 (42 wt. % Ni) or # 4 (4 wt. % Ni) alloy, similarly have an inflection behavior in their thermal expansion profiles. Accordingly, it is contemplated the principles of the present invention may be equally applied to such electronic housing modules by reformulating the ratio of Cu to W so as to match the thermal expansion profiles of the dissimilar materials for temperatures below the Curie temperature of the Ni—Fe alloy. Similarly, a solder or braze that melts below the Curie temperature of the Ni—Fe alloy may be used to join the dissimilar materials.

I claim:

1. An optical module including a housing having an assembly platform supporting an optical device contained therein, and at least one module sidewall, said assembly platform and said at least one module sidewall being made of dissimilar first and second materials having first and second thermal expansion profiles, respectively, wherein the improvement comprises said first thermal expansion profile substantially matching said second thermal expansion profile for temperatures below an inflection temperature of said second thermal expansion profile, said inflection temperature delimiting substantially linear portions of said second thermal expansion profile with dissimilar slopes, and wherein said assembly platform and said at least one module sidewall are joined with a joining material melting at a temperature less than said inflection temperature.

2. The optical module of claim 1 wherein said optical device is a laser.

3. The optical module of claim 2 wherein said housing further includes an opening for allowing the passage of a fiber into the interior of the housing, said fiber and laser being in alignment so as to couple light emitted from said laser into said fiber.

4. The optical module of claim 3 wherein said fiber is hermetically sealed into the opening of the housing.

5. The optical module of claim 3 further comprising a carrier disposed on said assembly platform, and a ferrule surrounding said fiber and secured to said carrier.

6. The optical module of claim 5 wherein said carrier is made of said second material.

7. The optical module of claim 1 further comprising a carrier disposed on said assembly platform with said optical device in turn disposed on said carrier.

8. The optical module of claim 7 wherein said carrier is made of BeO.

9. The optical module of claim 1 wherein said assembly platform is made of Cu—W.

10. The optical module of claim 1 wherein said inflection temperature is the Curie temperature of said second material.

11. The optical module of claim 1 wherein said at least one module sidewall is made of Kovar®.

12. The optical module of claim 1 wherein said joining material is a Au—Sn braze.

13. The optical module of claim 1 wherein said joining material is a Au—Ge braze.

14. The optical module of claim 1 wherein said joining material is a Au—Si braze.

15. The optical module of claim 1 wherein said joining material is a solder.

16. In a method for manufacturing a photonic module including a housing with an assembly platform made of a first material and sidewalls made of a second material, the improvement comprising reformulating the composition of the first material such that the thermal expansion coefficient thereof substantially matches the average thermal expansion coefficient of the second material for temperatures below the second material's Curie temperature, and joining said assembly platform and said sidewalls with a joining material having a melting temperature below the Curie temperature of the second material.

17. The method of claim 16 wherein said first material is Cu—W.

18. The method of claim 16 wherein said second material is Kovar®.

19. The method of claim 16 wherein said first material is Cu—W and said second material is Kovar®, and wherein the step of reformulating includes reformulating the Cu to W ratio such that the thermal expansion coefficient thereof substantially matches the average thermal expansion coefficient of the Kovar® for temperatures below Kovar®'s Curie temperature.

20. The method of claim 16 wherein said joining material is a Au—Sn braze.

21. The method of claim 16 wherein said joining material is a Au—Ge braze.

22. The method of claim 16 wherein said joining material is a Au—Si braze.

23. The method of claim 16 wherein said joining material is a solder.

24. An improved housing module made from at least first and second dissimilar materials, said first material having a first thermal expansion profile, and said second material being an alloy composite and having a nonlinear thermal expansion which may be approximated as having a second thermal expansion profile for temperatures up to a predetermined delimiting temperature, and thereafter a third thermal expansion profile, wherein the improvement comprises matching said first and second thermal expansion profiles, and joining said first and second materials with a third material that melts at a temperature less than said predetermined delimiting temperature.

25. The improved housing module of claim 24 wherein said first and second thermal expansion profiles are matched by reformulating the alloy composition of said first material.

26. The improved housing module of claim 24 wherein said predetermined delimiting temperature is the Curie temperature of said second material.

27. The improved housing module of claim 24 wherein said first material is Cu—W.

28. The improved housing module of claim 24 wherein said second material is Kovar®.

29. The improved housing module of claim 24 wherein said second material is Ni—Fe.

30. The improved housing module of claim 24 wherein said third material is a Au—Sn braze.

31. The improved housing module of claim 24 wherein said third material is a Au—Ge braze.

32. The improved housing module of claim 24 wherein said third material is a Au—Si braze.

33. The improved housing module of claim 24 wherein said third material is a solder.

34. The improved housing module of claim 24 wherein said housing includes an assembly platform for supporting an optical device.

35. The improved housing module of claim 34 wherein said optical device is a laser.

36. The improved housing module of claim 34 wherein said housing further includes an opening for allowing the passage of a fiber into the interior of the housing, said fiber and optical device being in alignment so as to couple light therebetween.

37. The improved housing module of claim 36 wherein said fiber is hermetically sealed into the opening of the housing.

38. The improved housing module of claim 37 further comprising a carrier disposed on said assembly platform, and a ferrule surrounding said fiber and secured to said carrier.

39. The improved housing module of claim 38 wherein said carrier is made of Kovar®.

40. The improved housing module of claim 34 further comprising a carrier disposed on said assembly platform with said optical device in turn disposed on said carrier.

41. The improved housing module of claim 40 wherein said carrier is made of BeO.

42. The improved housing module of claim 24 wherein said housing includes an assembly platform for supporting an electronic device.

* * * * *